United States Patent [19]

Kondo

[11] B 3,998,466
[45] Dec. 21, 1976

[54] FLEXIBLE SEALING BOOT
[75] Inventor: Toshio Kondo, Chiryu, Japan
[73] Assignee: Aisin Seiki Kabushiki Kaisha, Japan
[22] Filed: Aug. 30, 1974
[21] Appl. No.: 501,975
[44] Published under the second Trial Voluntary Protest Program on March 2, 1976 as document No. B 501,975.
[30] Foreign Application Priority Data
Aug. 31, 1973  Japan .......................... 48-102981
[52] U.S. Cl. .................................. 74/18.2; 92/168; 188/72.5; 277/DIG. 4
[51] Int. Cl.² ......................................... F16J 15/52
[58] Field of Search ............. 188/322, 72.5; 74/18, 74/18.2; 277/212, 212 FB

[56] References Cited
UNITED STATES PATENTS

| | | | |
|---|---|---|---|
| 3,535,942 | 10/1970 | Kateb ................................. | 74/18.2 |
| 3,712,422 | 1/1973 | Haraikawa et al. .............. | 188/72.5 |

*Primary Examiner*—Robert I. Smith
*Attorney, Agent, or Firm*—Oblon, Fisher, Spivak, McClelland & Maier

[57] ABSTRACT

A sealing boot of elastic material in, or for use in, a cylinder and piston assembly of a vehicle brake system, including as integrally formed parts thereof an inner sleeve portion for elastically mounting in a peripheral groove of the piston, an outer sleeve portion for elastically mounting in a peripheral groove of the cylinder, and a flexible bellow portion which connects the inner sleeve portion to the outer sleeve portion, the outer sleeve portion being provided with an integral, thick flange portion which extends axially with respect to the cylinder from the peripheral groove of the cylinder toward the outside of the cylinder, thereby accomplishing a complete sealing function while reducing the possibility of damage from foreign objects or the withdrawal from the cylinder and piston assembly.

3 Claims, 5 Drawing Figures

FLEXIBLE SEALING BOOT

BACKGROUND OF THE INVENTION

1. Field of the Invention

This invention relates generally to improvements in sealing boots, and more particularly to a flexible sealing boot used between the cylinder and piston of a hydraulically operated brake system for a vehicle.

2. Description of the Prior Art

A conventional flexible sealing boot and the operation thereof is explained with reference being made to FIG. 5 wherein the numeral 53 designates a flexible sealing boot which is arranged between a piston 52 and a cylinder 51 of a hydraulically operated brake system for a vehicle. The flexible sealing boot 53, which is conventionally made of rubber or a rubber-like material, is formed with inner and outer cylindrical sleeve portions connected to each other by a flexible web portion 53b which is thinner than the inner and outer sleeve portions. The inner sleeve portion 53a is resiliently mounted in an annular groove 52a provided on the peripheral surface of the piston 52 and the outer sleeve portion 53c is resiliently mounted in an annular groove 51a provided on the peripheral surface of the cylinder 51. The resilient mounting is created by the biasing force arising from the difference between the inside diameter of the inner sleeve portion 53a and the outside diameter of the groove 53a of the piston 52 and the biasing force between the inside diameter of the outer sleeve portion 53c and the outside diameter of the groove 51a of the cylinder 51 in the unstretched condition. However, the thickness of the connecting portion of the web portion 53b and the outer sleeve portion 53c is generally insufficient to prevent damage from foreign objects such for example as road stones. Furthermore, the thickness of the connecting portion of the web portion 53b and the outer sleeve portion 53c is generally insufficient to retain the biasing force of the outer sleeve portion 53c such that the outer sleeve portion 53c is likely to withdraw from the cylinder 51, and the sealing boot 53 can very quickly lose its sealing ability. A split clamping ring 54 has been fitted over the outer sleeve portion 53c in order to prevent withdrawal from the cylinder 51 during operation. However, use of such a split ring 54 tends to pucker the outer sleeve portion 53c in the region of the split ring 54 damaging the outer sleeve portion 53c and resulting in the sealing boot being gripped at discrete points instead of uniformly.

SUMMARY OF THE INVENTION

It is therefore an object of this invention to provide an improved flexible sealing boot adapted for obviating the above-mentioned conventional drawbacks.

It is another object of this invention to provide an improved flexible sealing boot capable of preventing damage from foreign objects.

It is a further object of this invention to provide an improved flexible sealing boot which can be securely fitted to a cylinder and piston assembly without fear of withdrawal therefrom.

It is a still further object of this invention to provide an improved flexible sealing boot of simple construction.

BRIEF DESCRIPTION OF THE DRAWINGS

Various other objects, features and attendant advantages of this invention will be more fully understood from the following detailed description when the same is read in connection with the accompanying drawings, in which like reference characters designate like or corresponding parts throughout the several views, and wherein.

DETAILED DESCRIPTION OF THE INVENTION

Figure 1:
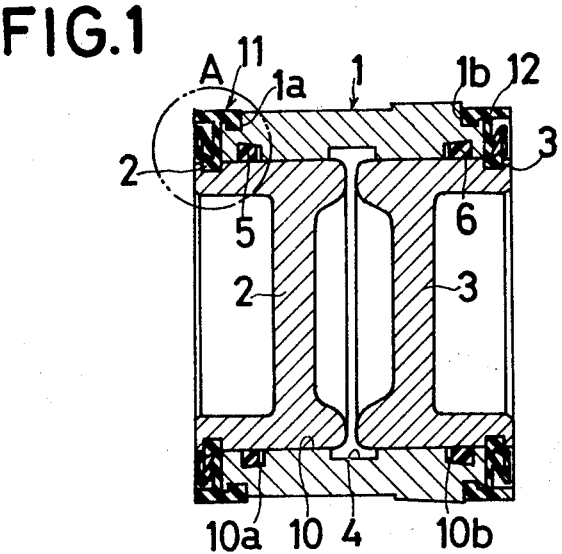
FIG. 1 is a cross-sectional view of a flexible sealing boot in accordance with the invention being fitted with a cylinder and piston assembly of a hydraulically operated brake system for a vehicle.
Figure 2:
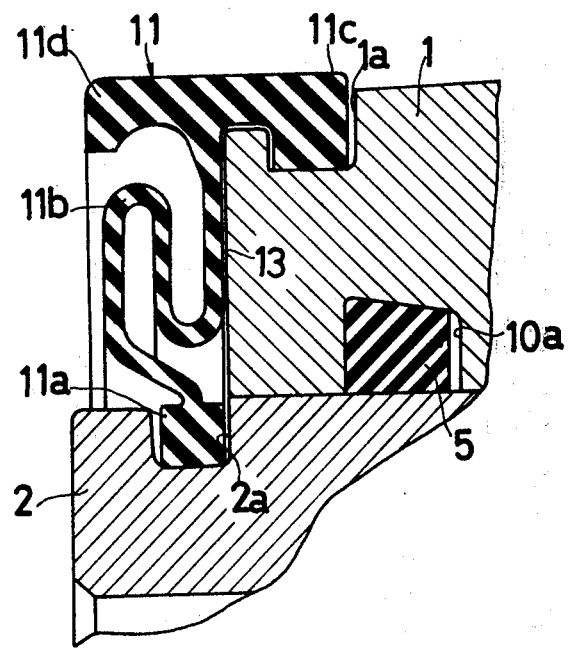
FIG. 2 is an enlarged view of part A of FIG. 1.

Referring now to FIGS. 1 and 2, there is shown a first embodiment of the invention fitted to a hydraulically operated vehicle brake system.

The numeral 1 denotes a hydraulic cylinder fixed to a vehicle body, not shown, which has openings at both ends thereof and annular boot grooves 1a and 1b formed on a peripheral surface thereof. A first hydraulic piston 2 and a second hydraulic piston 3 are opposed to each other and are slidably fitted within the cylinder. The first and second hydraulic pistons 2 and 3 are provided with annular boot grooves 2a and 3a on the respective peripheral surfaces thereof. A hydraulic pressure chamber 4 is defined by an inner surface 10 of the cylinder 1, and the first piston 2 and second piston 3 are positioned therein. The supplying and draining of oil under pressure occurs through an inlet and an outlet, not shown, which is operated in a conventional manner well known to those skilled in the art. Annular piston sealing members 5 and 6 are secured to annular piston sealing grooves 10a and 10b which are formed on the inner surface 10 of the cylinder 1 in order to provide a seal between the first piston 2 and the inner surface 10 of the cylinder 1, and between the second piston 3 and the inner surface 10 of the cylinder 1. The annular boot groove 1a of the cylinder 1 and the annular boot groove 2a of the piston 2 are fitted with an elastically flexible sealing boot 11. The annular boot groove 1b of the cylinder 1 and the annular boot groove 2b of the piston 2 are also fitted with an elastically flexible sealing boot 12.

The flexible sealing boot 11, being shown separately in FIG. 2, which is an integral one-piece moulding of rubber or rubber-like material, includes an inner cylindrical sleeve portion 11a, connected by a flexible bellow portion 11b which extends along the open end 13 of the cylinder 1 and permits displacement of the piston with respect to an outer sleeve portion 11c. The inner sleeve portion 11a of the sealing boot 11 is mounted in the annular boot groove 2a of the piston 2, with the inside diameter of the inner sleeve portion 11a preferably being slightly less than the outside diameter of the annular boot groove 2a such that an effective seal is ensured. The outer sleeve portion 11c of the sealing boot 11 is mounted in the annular boot groove 1a of the cylinder 1, with the inside diameter of the outer sleeve portion 11c preferably being slightly less than the outside diameter of the annular boot groove 1a such that an effective seal is ensured. Both the inner and outer sleeve portions 11a and 11c are considerably thicker than the flexible bellow portion 11b. Furthermore, the outer sleeve portion 11c has a thick flange portion 11d which extends axially with respect to the cylinder 1 from the peripheral groove 1a of the cylinder 1 beyond the outside of the open end 13 of the cylinder 1. The thick flange portion 11d of the flexible sealing boot 11 prevents the connecting portion of the outer sleeve portion 11c and the flexible bellow portion 11b from being damaged by foreign objects such as stones and also prevents the outer sleeve portion 11c from removal from the annular boot groove 1a of the cylinder 1, such that good sealing of the flexible sealing boot 11 is ensured. The construction and operation of the flexible sealing boot 12 shown in FIG. 1 is otherwise identical with that of the flexible sealing boot 11 which has been explained above. Therefore, the detailed explanation of boot 12 is omitted.

Figure 3:
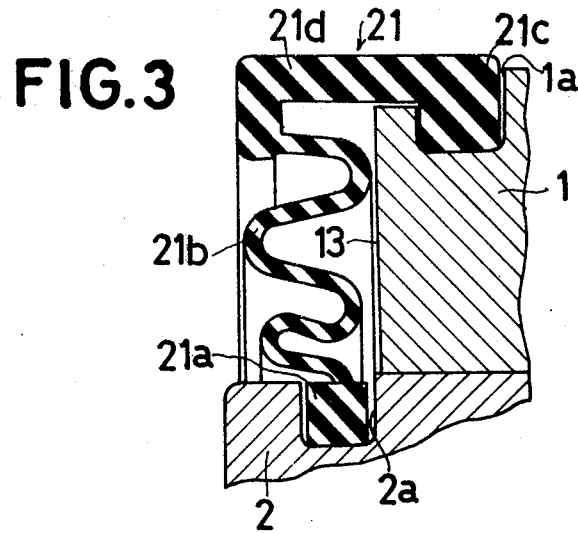
FIGS. 3 and 4 are views similar to FIG. 2, but showing other embodiments of the flexible sealing boot in accordance with the invention.
Figure 4:
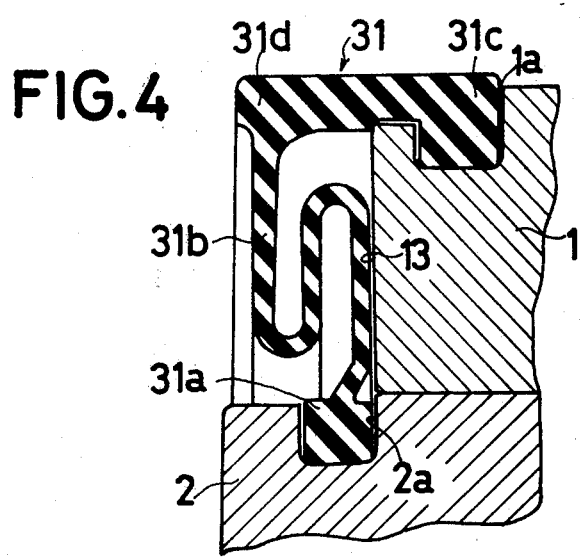
Figure 5:
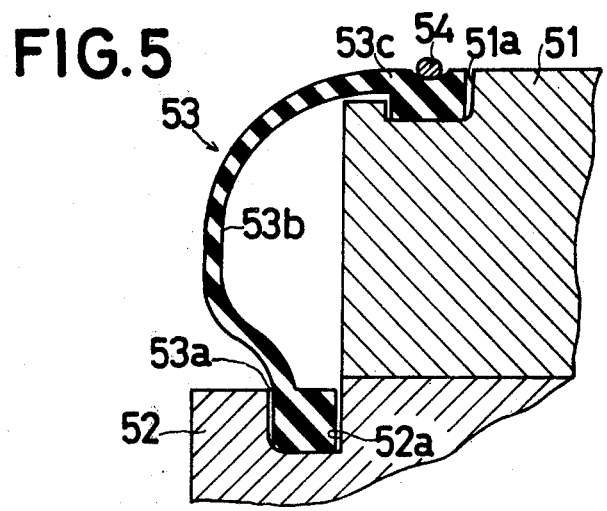
FIG. 5 is a view similar to FIG. 2, but showing a conventional prior art flexible sealing boot.

FIGS. 3 and 4 show other embodiments of the flexible sealing boot 11 of FIGS. 1 and 2. The thick flange portion 21d of the flexible sealing boot 21 is connected at the end portion thereof to the flexible bellow portion 21b of boot 11, as shown in FIG. 3, and the thick flange portion 31d of the flexible sealing boot 31 is connected at the end thereof to the flexible bellow portion 31b of boot 31 as shown in FIG. 4. The construction and operation of these flexible sealing boots 21 and 31 are substantially the same as in the first embodiment of this invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A sealing boot of elastic material for use in a cylinder and piston assembly of a vehicle brake system comprising, as integrally formed parts thereof:
   an inner sleeve portion for elastic mounting in a peripheral groove of said piston,
   an outer sleeve portion for elastic mounting in a peripheral groove of said cylinder, and
   a flexible bellow portion connecting said inner sleeve portion to said outer sleeve portion,
   said outer sleeve portion being provided with an integral thick flange portion which interconnects said bellow sleeve portion and said outer sleeve portion and which extends axially with respect to said cylinder from said peripheral groove of said cylinder beyond the outside of an open end of said cylinder such that the entire axial length of the outer portion of said boot includes a substantially thickened portion which comprises said outer sleeve portion and said flange portion.

2. A sealing boot in accordance with claim 1, in which said inner and outer sleeve portions are considerably thicker than said flexible bellow portion.

3. A sealing boot in accordance with claim 2, in which the inside diameter of said inner sleeve portion is slightly less than the outside diameter of said peripheral groove of said piston and the inside diameter of said outer sleeve portion is slightly less than the outside diameter of said peripheral groove of said cylinder.

* * * * *